United States Patent Office.

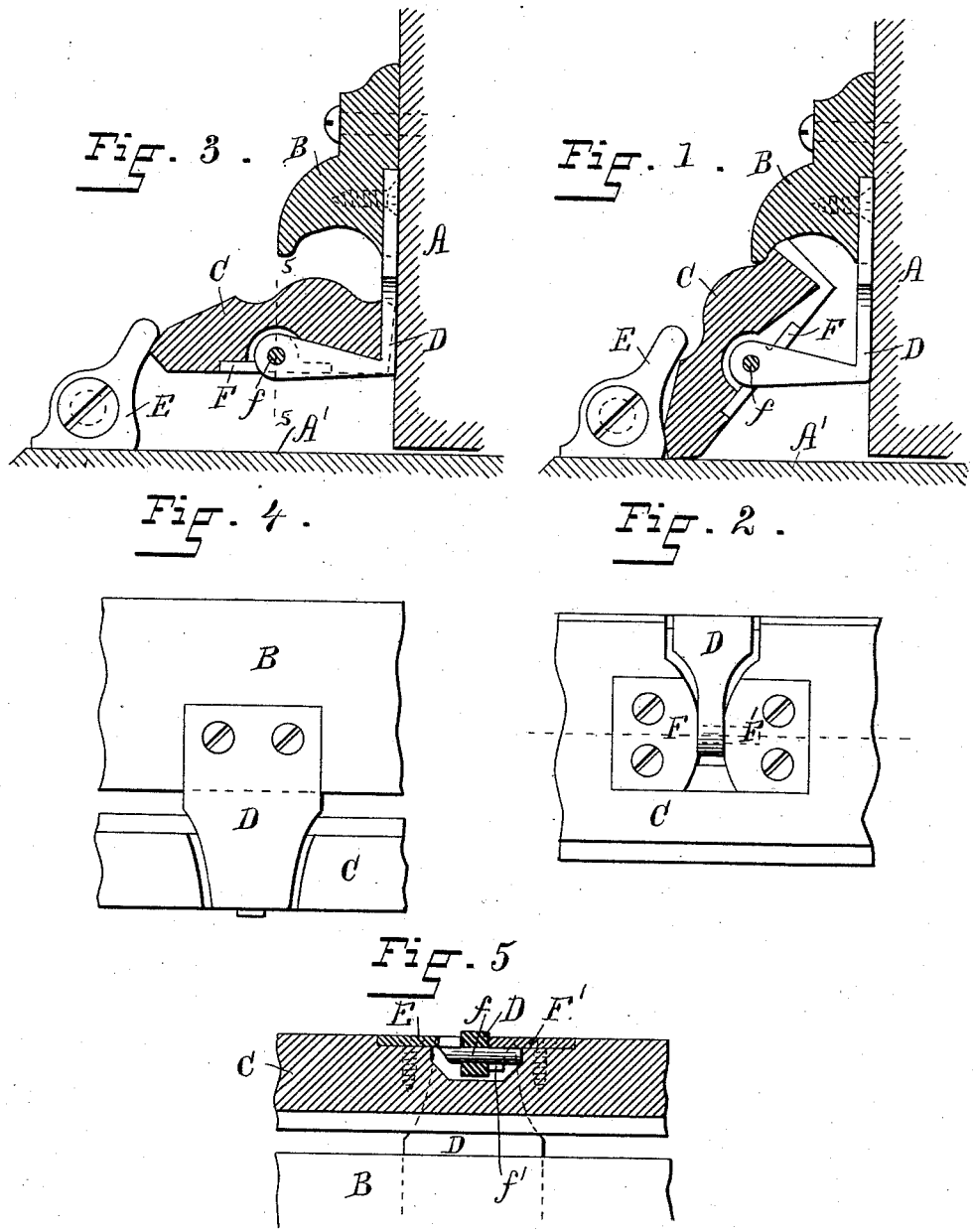

WARREN H. PLYMPTON, OF PROVIDENCE, RHODE ISLAND.

WEATHER-STRIP.

SPECIFICATION forming part of Letters Patent No. 327,106, dated September 29, 1885.

Application filed March 3, 1885. (No model.)

*To all whom it may concern:*

Be it known that I, WARREN H. PLYMPTON, of the city and county of Providence, and State of Rhode Island, have invented a new and useful Improvement in Weather - Strips, of which the following is a full, clear, and exact description, reference being had to the accompanying drawings, forming a part of this specification.

My invention relates to weather - strips which are composed of two members, one of which is secured rigidly to the door, while the other member is attached movably upon the rigid member, so as to incline outward when the door is open, and close tightly against the door when the same is shut. In this class of strips the movable member has heretofore, in many cases, been hinged at its upper edge to the rigid member, and a spring or springs have been employed to hold the movable member outward when the door is open, so as to clear the sill when the door is being closed. This construction is defective, because the springs become quickly destroyed and permit the movable member to drop down, so that when the door is closed the movable member strikes the sill, and is either broken or prevents the closing of the door. Furthermore, it is desirable to so hinge the strip as to have support from the door directly.

The object of my invention is to produce a weather - strip in which the movable member is held in its normal inclined position by force of gravity alone, so that all necessity of springs is avoided, and to hinge the strip as above suggested, whereby the device is rendered reliable in action and durable in construction.

My invention consists in certain peculiar and novel details of construction and arrangement, as hereinafter described and claimed.

In order that my invention may be fully understood, I will proceed to describe it with reference to the accompanying drawings, in which—

Figure 1 is a sectional view of my improved strip in closed condition. Fig. 2 is a rear view of the movable strip. Fig. 3 is a sectional view of the strip in open condition. Fig. 4 is a rear view of the rigid strip. Fig. 5 is a sectional view on the line 5 5 of Fig. 3, showing one of the pivots for the movable member.

In the said drawings, A designates a door, A' the sill or floor, and B the fixed member of the strip. C designates the movable member; D, one of the arms upon which said member is hinged, and E designates a stop against which the movable member strikes when the door is closed.

The fixed member B is in the form of a molding of any suitable character, and is screwed or otherwise rigidly secured upon the door.

The arms D, of which there may be any suitable number, are of L shape, and secured each at its upper end to the inner side of the molding B. The outer end of arm D is formed with an eye, through which extends a pin, $f$, formed on the under side of a plate, F, secured to the under side of strip C, and entering between two lugs, $f'$, upon the under side of a companion plate, F'. These two plates, together with the pin, constitute the pivot of the movable member, and said pivot is so placed that the center of gravity of the movable member will be above the pivots, and consequently the movable member will lie normally horizontal upon the lower parts of arms D, as shown in Figs. 2 and 3.

When the door is shut, the outer edge of the movable strip will be engaged by the stop E, which is placed in suitable position for this purpose, and said stop will throw the strip downward into closed position, as shown in Figs. 1 and 2. The meeting surfaces of the strips are formed to accurately register, so as to make tight joints, and, if desired, any suitable packing may be employed. Thus no springs are required in the device, and the same is certain in action and very durable.

The arms D serve not only to support the movable strip in horizontal position, but greatly increase the strength of the entire device by relieving the upper molding of the weight of the movable strip, and of the thrusts brought thereon.

Having thus described my invention, I claim as new and desire to secure by Letters Patent—

1. The combination of member B, arm D, and member C, pivoted upon said arm so as to tilt automatically into open condition by gravity, as set forth.

2. The combination, with member C, having plate F, with its pin $f$, and plate F', with its lug $f'$, of member B and arm D, substantially as and for the purposes stated.

3. The combination of member B, arm D, member C, with plate F, having pin $f$, and plate F', with lugs $f'$, and the stop E, as described.

WARREN H. PLYMPTON.

Witnesses:
M. F. BLIGH,
J. A. MILLER, Jr.